United States Patent [19]

Bergström et al.

[11] Patent Number: 4,990,383
[45] Date of Patent: Feb. 5, 1991

[54] PLASTIC COATED STEEL TUBE AND METHOD FOR PREPARING THE SAME

[75] Inventors: Christer Bergström; Johan Von Knorring, both of Espoo; Mikko Karttunen, Porvoo, all of Finland

[73] Assignee: Neste Oy, Finland

[21] Appl. No.: 361,491

[22] Filed: Jun. 5, 1989

[30] Foreign Application Priority Data

Jun. 7, 1988 [FI] Finland ................................. 882691

[51] Int. Cl.$^5$ .......................... F16L 9/00; B05D 3/00
[52] U.S. Cl. ................................... 428/35.9; 427/195; 427/377; 427/409; 427/410; 428/36.91; 428/447; 138/146
[58] Field of Search .................. 428/35.8, 35.9, 36.91, 428/447; 427/195, 377, 409, 410; 138/146

[56] References Cited

U.S. PATENT DOCUMENTS

| 4,499,145 | 2/1985 | Yanagida et al. | 428/418 |
| 4,642,260 | 2/1987 | Wakita et al. | 428/448 |
| 4,849,293 | 7/1989 | Koga et al. | 428/447 |
| 4,870,111 | 9/1989 | Donuiff et al. | 521/91 |

FOREIGN PATENT DOCUMENTS 0065318  5/1977  Japan ................................. 428/35.8

Primary Examiner—James Seidleck
Attorney, Agent, or Firm—Steinberg & Raskin

[57] ABSTRACT

The invention concerns a plastic coated steel tube which contains at least one layer of a polyolefin which has been modified with a hydrolyzable silane, and also a method for preparing this tube.

21 Claims, No Drawings

PLASTIC COATED STEEL TUBE AND METHOD FOR PREPARING THE SAME

BACKGROUND OF THE INVENTION

The present invention concerns a plastic coated steel tube, comprising at least one plastic layer containing a hydrolyzable silane. The purpose of the silane-containing layer is to bond the plastic coating onto steel or epoxy-coated steel. Moreover, the silane-containing plastic layer is cross-linked which improves its mechanical and thermal properties.

Plastic coated steel tubes have previously been produced, e.g. for transporting natural gas, the steel tube being first shot-blasted and cleaned, and thereafter heated with a gas flame or in an induction furnace to 90° to 230° C., to be thereafter coated with a black polyethylene compound and with a hot melt or an ethylene polymer containing acid (the acid may be doped or copolymerized) for adhesion layer.

This two-layer coating process can be carried out with both layers being co-extruded or tandem-extruded, the tube being passed through a die (cross-head coating), or so that the tube rotates at the same time while a film of molten plastic is extruded thereupon (spiral coating). It is also common to apply the adhesion layer on the tube by powder coating. It is important, in any case, that the adhesion between plastic and steel is sufficiently good to exclude entry of moisture which would corrode the steel.

Recently, epoxy has also been introduced for corrosion protection of steel tubes, because epoxy is highly adhesive to steel. On the other hand, epoxy is rather sensitive to impact and therefore an epoxy-coated steel tube is usually additionally coated with a black polyethylene compound and with an acid-containing ethylene polymer as an adhesion layer. This three-layer coating (MAPEC technique) is accomplished principally in the same manner as a two-layer coating, with the exception that epoxy is coated as powder or liquid immediately before the adhesion layer coating. The coating with these layers has to be very closely controlled. The epoxy must not be too insufficiently cured (too low a temperature or too short a time), or too greatly cured (too high a temperature or too long a time) when the adhesion layer is applied, in order to obtain the desired adhesion (the requirements are considerably higher than for two-layer coating). Additionally, the temperature of the adhesion plastic must be sufficiently high (over 210° C.).

The three-layer coating has been introduced on the basis of increasing demand imposed in various countries. In addition to the increased requirements concerning the level of adhesion, requirements are also imposed on aging strength, adhesion at low or high temperatures, etc. These demands are standardized in various countries. The adhesion plastics for two-layer coating and three-layer coating of steel tubes currently available on the market, are based on polyethylene and polypropylene or on their copolymers grafted with low content (less than 1%) of unsaturated acid (e.g. maleic acid anhydride) or ethylene copolymers or terpolymers containing high amounts (over 4%) of unsaturated acid (e.g., acrylic acid or maleic acid anhydride).

The traditional adhesion plastics are aggressive in the extrusion process, and require well-controlled conditions when coating on steel or epoxy. Moreover, these adhesion plastics usually melt at fairly low temperature (not thermally stable), and they are not cross-linkable.

Silanes are traditionally used on monomers when producing silicones, and a so-called coupling agents in order to improve the adhesion between, e.g., fillers, glass fiber, and plastic.

In the plastics industry, silane-grafted polyolefins or ethylene-silane polymers or terpolymers are also used for cross-linking under the influence of a silanol condensation catalyst and water. Silane-grafted polyolefins and ethylene-silane copolymers or terpolymers also exhibit good adhesion to metals, such as steel and aluminum, as well as to polar plastics, such as polyamide, polyester, etc., while the adhesion can be improved by blending in organic acids or amino silanes.

SUMMARY OF THE INVENTION

Accordingly, it is an object of the present invention to improve coating of steel tubes with plastic.

It is also an object of the present invention to provide a plastic-coated steel tube with improved properties.

It is another object of the present invention to provide a new and improved process of coating a steel tube with plastic.

These and other objects are attained by the present invention which is directed to a plastic-coated steel tube, comprising at least one layer of polyolefin modified with hydrolyzable silane. The present invention is also directed to a method for coating a steel tube with plastic, comprising the step of applying to the tube at least one layer of polyolefin modified with hydrolyzable silane.

Therefore, the present invention concerns a plastic-coated steel tube comprising at least one plastic layer containing hydrolyzable silane. The plastic layer may contain a polyolefin which has been modified with the hydrolyzable silane, i.e. grafted to or copolymerized with the hydrolyzable silane, which induces improved adhesion to steel in two-layer coating, and to epoxy in three-layer coating of steel tubes.

The polyolefin layer modified with the hydrolyzable silane, can be cross-linked under the influence of moisture and possibly with the aid of a silanol condensation catalyst. The silanol condensation catalyst is added to the polyolefin modified with the hydrolyzable silane, or to another polymer, prior to the coating process itself. The hydrolyzable silane is preferably an unsaturated alkoxy silane, which has been copolymerized with or grafted to the polyolefin chain.

DESCRIPTION OF THE PREFERRED EMBODIMENTS

Grafting with hydrolyzable silane may take place by means of a radical reaction in which a polymer radical is formed, which then, in turn, may react with an unsaturated group in the silane. This reaction mechanism may be caused, e.g., by a peroxide initiator forming radicals at elevated temperature, and the radicals cleaving off hydrogen from the polyolefin chain. Also, other types of radical initiators are encountered, and it is moreover possible to obtain polymer radicals by means of irradiation (e.g., EB). hydrolyzable silanes may also be grafted to polyolefin chains in another manner, by a functional group in the silane (e.g. an amino group) reacting with a functional group in the polyolefin (e.g. butylacrylate).

When a hydrolyzable silane is to be copolymerized or terpolymerized with an olefin, the silane must, in contrast, always contain an unsaturated group. hydrolyzable silane is an organic silicon compound which, under influence of water, forms silanol groups. Generally, it is alkoxy groups (mostly methoxy groups) which are hydrolized in this manner, but acetoxy and chloride groups may also be considered. The most commonly encountered hydrolyzable silane for cross-linking polymers, is vinyl-trimethoxysilane (VTMO), but vinyl-triethoxysilane (VTEO), vinyl-tris-methoxy-ethoxysilane (VTMOEO) and methacryloxy-propyl-trimethoxysilane (MEMO) are also common. Additionally, mono- and di-alkoxy silanes are also available, as well as vinyl-methyl-dimethoxy-silane (VMDMO).

The unsaturated alkoxysilane is preferably vinyl-trimethoxysilane, vinyltriethoxy-silane, vinyl-methyl-dimethoxysilane, vinyl-methyl-diethoxysilane, vinyl-dimethyl-monoethoxy-silane, vinyl-dimethyl-monoethoxy-silane, vinyl-tris-methoxy-ethoxy-silane, allyl-trimethoxysilane, allyl-triethoxy-silane, methacryloxy-propyl-trimethoxysilane, or methacryloxypropyl-triethoxysilane.

Any polyolefin may be used, in principle, as a base polymer for grafting the hydrolyzable silane, but the most common polymers are polyethylene (LDPE, HDPE, LMDPE, LLDPE, VLDPE and ULDPE), various ethylene copolymers (EVA, EBA, EEA, EMA) and polypropylene (PP) and its co-polymers. Regarding copolymers or terpolymers with unsaturated hydrolyzable silane as comonomer, the most common polymers are E-VTMO, E-BA-VTMO, E-MA-VTMO, and E-MEMO which have been produced by high-pressure polymerization. The polyolefin modified with the hydrolyzable silane may be based upon polyethylene, ethylene-copolymer, or polypropylene. Preferably, the polyolefin modified with the hydrolyzable silane is based on the group consisting of LDPE, EVA, EBA, EEA, EMA, HDPE, LMDPE, LLDPE, VLDPE, ULDPE, PP, or mixtures of these.

The content of hydrolyzable silane in silane-containing polyolefin layers in plastic-coated steel tubes may be about 0.1 to 5% by weight, preferably about 0.5 to 3% by weight.

The silane-containing layer is cross-linked by influence of water, in that the silane is first hydrolized with formation of silanol groups, which, in turn, thereafter condense to form siloxane bridges. The reaction takes place slowly in storage and during service of the tube, because the polyethylene compound takes up moisture from the environment. A layer containing higher amounts of water, or a layer which through a chemical reaction splits off water, may also be used. The polyolefin layer modified with hydrolyzable silane may be swiftly cross-linked by treatment in hot water or steam.

The cross-linking process may also be effected at a higher speed by heating the plastic-coated steel tube, and by using a so-called silanol condensation catalyst, such as, e.g. dibutyl tin dilaurate, or dioctyl tin dilaurate. This silanol condensation catalyst is usually added as a master batch at extrusion of the silane-containing layer, but it may also be added to the outer layer which is usually a black polyethylene compound, or to the epoxy layer, or to another layer which is part of the plastics coating. Preferably, the steel tube may be coated with two layers of plastic, namely with a polyolefin layer modified with hydrolyzable silane, and with an outer layer of a soot-blended polyolefin compound containing carbon black. The steel tube may be more preferably coated with three layers of plastic, namely an inner epoxy layer, the polyolefin layer modified with the hydrolyzable silane, and an outer layer of the soot-blended polyolefin compound containing carbon black.

If the silane condensation catalyst is included in a layer other than the silane containing layer, then extrusion will be easier to perform because gel formation which would result in clumping is less likely to occur. In contrast, the silanol condensation catalyst readily diffuses after extrusion into the silane-containing layer from the layer containing the silanol condensation catalyst. It is clear that the catalyst may also be applied by spraying or brushing on the silane-containing layer, in connection with the coating or by a separate treatment. The silanol condensation catalyst is added in an amount such that after equilibrium, about 0.01 to 0.5% of the catalyst is obtained in the silane-containing layer.

Thus, the silanol condensation catalyst may be added to the outer polyolefin compound before the coating process, where it diffuses from the outer layer of the coating into the polyolefin layer modified with the hydrolyzable silane, which is thereby cross-linked. Furthermore, the polyolefin layer may be co-extruded or tandem-extruded on the steel tube with a cross-head die or by spiral coating, or the coating of the polyolefin layer may be accomplished with a powder spray. Moreover, if an inner epoxy layer is applied, then the coating of the polyolefin layer may takes place is tandem with the epoxy coating, or in a separate, subsequent process therefrom.

The present invention will be illustrated in greater detail below, by the following non-limiting examples:

EXAMPLE 1

Spiral coating of steel tubes using two-layer technique and three-layer technique was simulated by coating a steel plate which moved horizontally on a track of rotating rolls. The 8 mm. thick sand-blasted and cleaned steel plates were heated in an electric oven to temperature $T_{fe}$ and transported through the coating line. Thereafter, an 80 micron layer of powder epoxy (Bitumes Speciaux' Eurokote 714.31) was applied by spraying (only in three-layer coating), and after an intercoating time $t_{int}$, the plate was extrusion-coated with a $S_{ad}$ thick layer of adhesion plastic having a temperature $T_{Ad}$, and immediately thereafter with a 1.5 mm. thick layer of black polyethylene compound (Neste A 3522-CJ, melt index 0.35 g/10 min. and carbon black content 2.5%) having a temperature of 220° C.

After the coating, the plastic layer was pressed against the steel plate with a roll at the pressure 2 kg/cm$^2$, and the plastic-coated steel plate was then cooled with water during one minute. After at least twenty four hours, the adhesion was determined using a 90 peel testing with pulling rate 50 mm./min. The testing was carried out at 23° and 60° C. Moreover, the adhesion at 23° and 60° C. was also measured after the plastic-coated steel plate had been cross-linked in 80° C. water for 12 hours.

It is shown in Example 1 how silane-containing ethylene polymers adhere to steel in two-layer coating. The temperature $T_{fe}$ of the steel was 210° C., the temperature $T_{Ad}$ of the adhesion plastic was 220° C., and the thickness $S_{Ad}$ of the adhesion layer was 300 microns.

As a reference, an acid grafted adhesion plastic (Neste AC 0444) was used, as well as an E-BA-AA-terpolymer (Lupolen 2910M by BASF), and an LDPE (Neste B 4524, melt index 4.5g/10 min. with density 924 kg/m$^3$).

TABLE 1

| Adhesions plastic Type | | Adhesion (N/cm) | |
|---|---|---|---|
| | | 23° C. | 60° C. |
| E-VTMO | MI = 0.7 g/10 min VTMO = 1.7% | 20.4 | 17.6 |
| E-BA-VTMO | MI = 4.5 g/10 min BA = 17% VTMO = 2% | 41.7 | 19.2 |
| E-MEMO | MI = 1.5 g/10 min MEMO = 1.3% | 36.2 | 22.3 |
| VTMO-grafted LDPE | MI = 0.7 g/10 min VTMO = 1.7% | 32.4 | 18.1 |
| Acid-grafted adhesion plastic | | 36.9 | 19.6 |
| E-BA-AA | | 34.8 | 21.3 |
| LDPE | | 0 | 0 |

The above results in Table 1 reveal that LDPE totally fails to adhere to steel at all, and that by using silane-containing ethylene polymers, adhesion values can be obtained which are on the same level as those of the acid-containing commercial adhesion plastic grades.

Among the silane-containing ethylene polymers, E-BA-VTMO-terpolymer proved to be the best. However, at elevated testing temperature (60° C.), all the polymers exhibited insufficient adhesion.

EXAMPLE 2

Example 2 shows how the silane-containing ethylene polymers noted in Example 1 adhere to epoxy in three-layer coating. The same temperatures were used for the steel, adhesion plastic, and black polyethylene compound as in Example 1. Two different intercoating times, 10 s and 20 s, were applied between epoxy coating and adhesion plastic coating.

TABLE 2

| Adhesion plastic Type | Adhesion (N/cm) | | |
|---|---|---|---|
| | 23° C. | | 60° C. |
| | 10 s | 20 s | 20 s |
| E-VTMO | 27.1 | 30.0 | 21.3 |
| E-BA-VTMO | 125.1 | 167.0 | 38.2 |
| E-MEMO | 48.2 | 52.6 | 36.5 |
| VTMO-grafted LDPE | 35.6 | 47.8 | 19.7 |
| Acid grafted adhesion plastic | 163.1 | 63.0 | 18.2 |
| E-BA-AA | 31.4 | 62.8 | 29.6 |
| LDPE | 0 | 0 | 0 |

The above results in Table 2 reveal that LDPE totally fails to adhere to the epoxy, and that by using silane-containing ethylene polymers, adhesion values can be achieved which are on a higher level than those of the acid containing commercial adhesion plastic grades. Of the silane-containing ethylene polymers, E-BA-VTMO terpolymer prove to be overwhelmingly superior, and high adhesion values were measured both with short and long intercoating times. However, at elevated testing temperature (60° C.), all these polymers displayed insufficient adhesion.

EXAMPLE 3

In Example 3, it is shown how different coating conditions affect the adhesion at room temperature after a two-layer coating with E-BA-VTMO, with acid-grafted adhesion plastic, and with E-BA-AA as adhesion layer. Those conditions which did not vary are the same as in Example 1.

TABLE 3

| Variation of conditions | | Adhesion (N/cm) | | |
|---|---|---|---|---|
| | | E-BA-VTMO | Acid grafted adhesion plastic | E-BA-AA |
| $T_{Fe}$ | = 150° C. | 32.5 | 15.9 | 26.9 |
| | = 185° C. | 39.2 | 22.6 | 31.4 |
| | = 210° C. | 41.7 | 36.9 | 34.8 |
| | = 225° C. | 51.2 | 33.1 | 47.6 |
| $T_{Ad}$ | = 150° C. | 52.2 | 29.3 | 27.0 |
| | = 170° C. | 48.3 | 33.4 | 31.7 |
| | = 220° C. | 41.7 | 36.9 | 34.8 |
| | = 240° C. | 42.2 | 37.4 | 35.2 |
| $S_{Ad}$ | = 200 microns | 37.9 | 27.1 | 25.7 |
| | = 300 microns | 41.7 | 36.9 | 34.8 |
| | = 400 microns | 48.2 | 38.6 | 39.6 |

The above results in Table 3 reveal that E-BA-ETMO terpolymer has the advantages that it is possible to use a lower temperature of the steel and of the adhesion plastic, and a thinner adhesion layer to achieve equivalent adhesion as with the acid-containing commercial adhesion plastics. All this results in reduced expenses. When a lower temperature can be maintained during extrusion of the adhesion plastic, the operation also becomes more reliable with less thermal decomposition in the extruder and fewer production breaks.

EXAMPLE 4

In Example 4, it is shown how different coating conditions affect the adhesion at room temperature after a three-layer coating with E-BA-VTMO, with acid-grafted adhesion plastic, and with E-BA-AA used as adhesion layer. Those conditions which were not varied are the same as Example 1, the intercoating time being 20 s.

TABLE 4

| Variation of conditions | | Adhesion (N/cm) | | |
|---|---|---|---|---|
| | | E-BA-VTMO | Acid grafted adhesion plastic | E-BA-AA |
| $T_{Fe}$ | = 210° C. | 167.0 | 63.0 | 62.8 |
| | = 220° C. | 157.9 | 53.1 | 52.2 |
| | = 240° C. | 163.1 | 55.7 | 56.1 |
| $T_{Ad}$ | = 150° C. | 158.3 | 32.6 | 29.2 |
| | = 170° C. | 169.2 | 47.8 | 45.3 |
| | = 220° C. | 167.0 | 63.0 | 62.8 |
| | = 240° C. | 153.7 | 67.3 | 69.1 |
| $S_{Ad}$ | = 200 microns | 113.2 | 42.7 | 37.2 |
| | = 300 microns | 167.0 | 63.0 | 62.8 |
| | = 400 microns | 169.3 | 62.4 | 67.1 |
| $t_{Int}$ | = 5 s | 117.8 | 38.2 | 26.7 |
| | = 10 s | 125.1 | 163.1 | 31.4 |
| | = 20 s | 167.0 | 63.0 | 62.8 |
| | = 30 s | 148.2 | 23.4 | 21.8 |

The above results in Table 4 reveal that the E-BA-VTMO terpolymer principally has the same advantages in three-layer coating as in two-layer coating (Example 3). The temperature of the steel plates could no doubt be further lowered, provided that powder epoxy which melts at lower temperature or a liquid epoxy is used. E-BA-VTMO can also be extruded at very low temperature, which results in better reliability in operation. It is to be noted that the E-BA-VTMO terpolymer gives very good adhesion values both with very short intercoating times (non-cross-linked epoxy) and with very long intercoating times (completely cross-linked epoxy). This causes the adhesion in a three-layer coating to be quite independent of the coating technique and equipment and of variations in the process conditions, this being a remarkable advantage.

EXAMPLE 5

In Example 5, it is shown how two-layer coated and three-layer coated steel tubes with a silane-containing adhesion layer, can be cross-linked with the aid of water and silanol condensation catalysts dibutyl tin dilaurate D(TDL) and dioctyl tin dilaurate (DOTDL). In three-layer coating, the intercoating time was 20 s. The catalyst was added in the form of a 1% master batch on the one hand into the adhesion plastics, and on the other hand to the black polyethylene compound, so that after equilibrium, be effect of migration between the different plastic layers, 0.05% of catalyst was obtained in the adhesion layer. Thereafter, the plastic-coated steel plates were kept in 80° C. water for twelve hours in order to produce cross-linking. The degree of cross-linking expressed as per cent of polymer insoluble in 140° C. xylene within 8 h., was determined and the adhesion at 23° and 60° C. was measured.

TABLE 5

| Cross-linked silane containing polymer | Degree of cross-linking (%) | Adhesion (N/cm) | | | |
|---|---|---|---|---|---|
| | | To steel | | To epoxy | |
| | | 23° C. | 60° C. | 23° C. | 60° C. |
| VTMO-grafted LDPE, DBTDL adhesion plastic | 67 | 27.1 | 25.2 | 39.7 | 32.8 |
| VTMO-grafted LDPE, DOTDL adhesion plastic | 62 | 25.3 | 23.0 | 36.8 | 27.1 |
| VTMO-grafted LDPE, DBTDL in the black polyethylene compound | 65 | 31.5 | 28.3 | 46.3 | 42.1 |
| E-BA-VTMO, DBTDL in the adhesion plastic | 78 | 36.3 | 25.1 | 87.4 | 63.1 |
| E-BA-VTMO, DBTDL in the black polyethylene compound | 76 | 38.9 | 35.7 | 161.5 | 74.2 |

The above results in Table 5 reveal that adhesion to steel as well as to epoxy at 23° C. is somewhat poorer in the case of cross-linked adhesion plastics, in comparison with the non-cross-linked adhesion plastic (Examples 1 and 2). At 60° C., in contrast, the adhesion of cross-linked adhesion plastic is clearly better. The best adhesion is obtained with E-BA-VTMO terpolymer and DBTDL, added to the black polyethylene compound.

EXAMPLE 6

Example 6 was carried out to further describe adhesion between silane-containing polymer and epoxy, in the case of various base polymers, silanes, and epoxy types. This laboratory method involves sand-blasted plates being heated to 210° C. in the case of powdered epoxy, and 180° C. for liquid epoxy (Bitumes Speciaux' Enodokote 427,31). Thereafter, the hot steel plates were coated with an 80 micron layer of epoxy and a 300 micron layer of powdered adhesion plastic. The powdered epoxy and adhesion plastic were coated by airborne spraying, and the liquid epoxy with a brush. When silanol condensation catalyst (DODTL) was used, it was mixed with the liquid epoxy.

The intercoating time was 5 s for powdered epoxy and 60 s. for liquid epoxy. Subsequent to the coating with adhesion plastic, hot (210° C.) steel cylinders (D= 20 mm.) were attached on the adhesion plastic and the coated steel plates were then cooled after 120 s. by dipping the same into water. At least 24 hours later, adhesion was tested by slowly pulling out the cylinders welded to the adhesion plastic, after making a cut through the plastics around the same (ISO4624 method). In this instance, the adhesion was calculated as force per unit surface area under the steel cylinder, this being expressed in N/cm².

In Example 6, EBA stands for DFDS 6417 by Neste, HDPE for DMDS 0935 by Neste, LLDPE for DFDS 9020 by Neste and VLDPE for Mitsui Petrochemicals' TAFMER A 4085.

TABLE 6

| | Adhesion (N/cm²) | |
|---|---|---|
| Test | Powdered epoxy | Liquid epoxy |
| LDPE | 0 | 0 |
| LDPE grafted with 0.1% VTMO | 10 | |
| LDPE grafted with 0.3% VTMO | 52 | |
| LDPE grafted with 1.0% VTMO | 85 | |
| LDPE grafted with 2.0% VTMO | 120 | 18 |
| LDPE grafted with 5.0% VTMO | 113 | |
| LDPE grafted with 2.0% VTEO | 36 | |
| LDPE grafted with 2.0% VMDMO | 48 | |
| LDPE grafted with 2.0% MEMO | 53 | |
| EBA grafted with 2.0% VTMO | 99 | |
| HDPE grafted with 2.0% VTMO | 100 | |
| LLDPE grafted with 2.0% VTMO | 118 | |
| VLDPE grafted with 2.0% VTMO | 69 | |
| E-VTMO | 57 | |
| E-MEMO | 35 | |
| E-BA-VTMO | 114 | 36 |
| LDPE grafted with 2.0% VTMO + 0.2% DOTDL | | 15 |
| E-BA-VTMO + 0.2% DOTDL | | 23 |
| E-BA-AA | 111 | 0 |

The above results in Table 6 reveal that silane-containing polyolefins display IMproved adhesion to epoxy at concentrations upwardly from 0.1%. Hydrolyzable silanes other than VTMO also act in a similar manner. They also reveal that hydrolyzable silanes improve the adhesion to epoxy independent of how the silane-containing polyolefin has been prepared. The silane may be copolymerized, grafted, or added in another manner. It is also possible to use polyolefins other than LDPE and ethylene copolymers produced by high-pressure polymerization. Furthermore, it is seen that silane-containing polyolefins may also be used to improve the adhesion to epoxy in liquid form.

The preceding description of the present invention is merely exemplary, and is not intended to limit the scope thereof in any way.

What is claimed is:

1. Plastic-coated steel tube, comprising a steel tube having thereon an inner layer of at least one cross-linked polyolefin modified with hydrolyzable silane and an outer unmodified or soot-blended polyolefin layer on the exposed surface of the inner layer.

2. The tube of claim 1, wherein said outer layer is a soot-blended polyolefin layer.

3. The tube of claim 1, wherein said hydrolyzable silane is an unsaturated alkoxy silane.

4. The tube of claim 3, wherein said unsaturated alkoxy silane is vinyl-trimethoxysilane, vinyl-triethoxysilane, vinyl-methyl-dimethoxy-silane, vinyl-methyl-diethoxysilane, vinyl-dimethyl-monqmethoxysilane, vinyl-dimethyl-monoethoxysilane, vinyl-tris-methoxyethoxysilane, allyl-trimethoxysilane, allyl-triethoxysilane, methacryloxypropyl-trimethoxysilane, or methacryloxypropyl-triethoxysilane.

5. The tube of claim 1, wherein said hydrolyzable silane is copolymerized with or grafted to the polyolefin chain.

6. The tube of claim 1, wherein the polyolefin modified with the silane is based on polyethylene, ethylene-copolymer, or polypropylene.

7. The tube of claim 6, wherein said polyolefin modified with the silane is selected from the group consisting of LDPE, EVA, EBA, EEA, EMA, HDPE, LMDPE, LLDPE, VLDPE, ULDPE, PP, and mixtures thereof.

8. The tube of claim 1, wherein said outer layer is a soot-blended polyolefin containing carbon black.

9. The tube of claim 8, having an epoxy layer between said steel tube and said inner layer.

10. The tube of claim 8, wherein said polyolefin modified with hydrolyzable silane is cross-linked by a silanol condensation catalyst being added to said outer layer before coating on the tube, and then diffusing from the outer layer into the polyolefin layer modified with the hydrolyzable silane.

11. The tube of claim 9, wherein said polyolefin modified with hydrolyzable silane is cross-linked by a silanol condensation catalyst being added to said outer layer before coating on the tube, and then disfusing from the outer layer into the polyolefin layer modified with the hydrolyzable silane.

12. The tube of claim 1, wherein said inner layer is coated on the tube by
co-extrusion or tandem-extrusion with a cross-head die or by spiral coating,
or by a powder spray.

13. The tube of claim 1, additionally comprising an epoxy layer between said steel tube and said inner layer, with said inner cross-linked polyolefin layer modified with the hydrolyzable silane being coated, in tandem with the epoxy layer coating, or in a separate, subsequent step.

14. Plastic coated steel tube, comprising a steel tube having thereon an inner layer of an epoxy resin, an intermediate layer of cross-linked polyolefin modified with a hydrolyzable silane on said epoxy layer, and an outer unmodified or soot-blended polyolefin layer thereon.

15. Method for coating a steel tube with plastic, comprising the step of
applying to said tube at least one layer of polyolefin modified with hydrolyzable silane,
cross-linking the polyolefin with the silane under influence of moisture, and
applying an outer layer of unmodified or soot-blended polyolefin onto the thus-formed cross-linked silane modified polyolefin layer.

16. The method of claim 15, comprising the additional step of
adding a silanol condensation catalyst to said at least one layer or to the outer layer, prior to applying on the tube, to speed up said cross-linking.

17. The method of claim 15, comprising the additional step of
co-polymerizing the polyolefin with said silane or grafting said silane to said polyolefin.

18. The method of claim 16, wherein said catalyst is added to a compound forming said outer layer before said application onto the tube, and is allowed to diffuse from said outer layer into the polyolefin layer modified with the silane, which is thereby cross-linked.

19. The method of claim 15, wherein said at least one layer is applied to said tube by
co-extrusion or tandem-extrusion with a cross-head die or by spiral coating,
or by a powder spray.

20. The method of claim 15, comprising the additional step of
applying an inner epoxy layer to said tube in tandem with said polyolefin layer modified with the silane said epoxy layer being applied onto said or in a separate preceding step to the application of the polyolefin layer modified with the silane.

21. The method of claim 15, comprising the additional step of
treating said at least one layer with hot water or steam to speed up said cross-linking.

* * * * *